| United States Patent [19] | [11] Patent Number: 4,634,740 |
| Fujita et al. | [45] Date of Patent: Jan. 6, 1987 |

[54] POLYPROPYLENE COMPOSITION

[75] Inventors: Yuji Fujita; Tadao Ikeda, both of Saitama; Tokuo Makishima, deceased, late of Saitama, all of Japan, by Nobuko Makishima, legal representative

[73] Assignee: Toa Nenryo Kogyo Kabushiki Kaisha, Tokyo, Japan

[21] Appl. No.: 720,823

[22] Filed: Apr. 8, 1985

[30] Foreign Application Priority Data

Apr. 9, 1984 [JP] Japan .................................. 59-69241

[51] Int. Cl.$^4$ ....................... C08L 23/06; C08L 23/16
[52] U.S. Cl. .................................................. 525/240
[58] Field of Search ......................................... 525/240

[56] References Cited

U.S. PATENT DOCUMENTS

| 3,200,173 | 8/1965 | Schilling | 525/270 |
| 3,595,842 | 7/1971 | Schrage et al. | 526/142 |
| 4,113,806 | 9/1978 | Watson et al. | 525/240 |

OTHER PUBLICATIONS

Manson et al—Polymer Blends & Composites—pp. 116–117, 11/79.
Exxon—Elastomers for Polyolefin Modification—pp. 31–35, 12/75.

Primary Examiner—Carman J. Seccuro
Attorney, Agent, or Firm—Myron B. Kurtzman

[57] ABSTRACT

A polypropylene composition having superior clarity and good low-temperature impact resistance, said composition comprising 65 wt % to 95 wt % crystalline polypropylene and 5 wt % to 35 wt % of ethylene-propylene random copolymer containing higher than 70 wt % to 85 wt % of ethylene.

3 Claims, No Drawings

POLYPROPYLENE COMPOSITION

FIELD OF TECHNOLOGY

The present invention relates to a polypropylene composition, and more particularly to a polypropylene composition which is superior in clarity and low-temperature impact resistance.

BACKGROUND OF TECHNOLOGY

Polypropylene is in use in many fields because of its superior mechanical properties, clarity, chemical resistance and processability. However, polypropylene has a disadvantage of being poor in impact resistance at low temperatures. Several methods have been proposed in order to overcome this disadvantage, such as incorporating polypropylene with polyethylene (Japanese Patent Publication No. 6975/1962), incorporating polypropylene with a solid propylene-ethylene copolymer containing 30 to 70 wt% of ethylene (Japanese Patent Publication No. 7088/1960), incorporating polypropylene with polybutene (Japanese Patent Publication No. 2245/1959), and incorporating polypropylene with polyisobutene (Japanese Patent Publication No. 10640/1960).

The above-mentioned methods are effective at improving the low-temperature impact resistance of polypropylene, but only at the sacrifice of polypropylene's inherent clarity. Therefore, the polymer products cannot be applied to the production of film or sheet or blowmoldings for food-packaging that requires clarity.

On the other hand, there is disclosed in Japanese Patent Publication No. 25693/1983 a composition composed of polypropylene, low-density polyethylene, and an amorphous ethylene-1-butene polymer or amorphous ethylene-propylene copolymer resulting from polymerization by a catalyst system consisting of a soluble vanadium compound and an organoaluminum compound. This composition is good in clarity but is decreased in stiffness and is not necessarily satisfactory in impact resistance.

SUMMARY OF THE INVENTION

It is an object of this invention to provide a polypropylene composition which has improved low-temperature impact resistance and yet preserves polypropylene's inherent clarity. This invention is a result of the present inventors' intensive studies on clarity.

Two methods were conceived for producing a polypropylene composition having the same degree of clarity as that of polypropylene. According to the first method, the component to be dispersed in polypropylene (referred to as the disperse phase) is divided into fine particles having a diameter smaller than the wavelength of light. According to the second method, polypropylene is incorporated with the disperse phase having the same refractive index as that of polypropylene. The first method requires that the disperse phase should have a considerably lower viscosity (molecular weight); but this leads to poor impact resistance. In addition, it is impossible to divide the disperse phase into fine particles having a diameter smaller than the wavelength of light.

As the result of intensive studies on the second method, it was found that an ethylene-propylene random copolymer containing a specific amount of ethylene produced by the polymerization with a polymerization catalyst composed of a titanium trichloride catalyst component, organoaluminum compound, and a Lewis base has the same refractive index as that of polypropylene. It was also found that this ethylene-propylene random copolymer improves the impact resistance of polypropylene when incorporated at a certain ratio into polypropylene, while preserving the clarity of polypropylene. The present invention was completed based on these findings.

DETAILED DESCRIPTION OF THE INVENTION

The gist of this invention resides in a polypropylene composition which comprises:
A. 65 to 95 wt% of crystalline polypropylene, and
B. 5 to 35 wt% of ethylene-propylene random copolymer containing higher than 70 wt% to 85 wt% of ethylene, said copolymer being one which is produced by copolymerizing ethylene with propylene in the presence of a polymerization catalyst composed of a catalyst component whose principal ingredient is titanium trichloride, an organoaluminum compound and a Lewis base selected from carboxylic acid ester, ether and ketone.

Polypropylene

The crystalline polypropylene used in this invention is a propylene homopolymer.

If the polypropylene composition is to have high stiffness, it is necessary that the crystalline polypropylene should contain more than 90 wt%, preferably more than 95 wt%, of boiing n-heptane insoluble matter (referred to as HI hereinafter). In addition, it should preferably have a melt flow rate (MFR) of 0.1 to 30 g/10 min (according to ASTM D-1238-65, load: 2160 g, temperature: 230° C.). The one having a MFR lower than 0.1 results in a composition which is poor in moldability, and the one having a MFR in excess of 30 provides a composition which is poor in stiffness.

Ethylene-propylene Random Copolymer

The ethylene-propylene random copolymer used in this invention is one containing higher than 70 wt% to 85 wt% of ethylene which is produced by copolymerizing ethylene with propylene in the presence of a polymerization catalyst composed of a catalyst component whose principal ingredient is titanium trichloride, an organoaluminum compound and a Lewis base selected from carboxylic acid ester, ether, and ketone.

The catalyst component constituting the polymerization catalyst is titanium trichloride obtained by reducing titanium tetrachloride by the known method. The titanium trichloride may be used as such or may be used after activation. Activation may be accomplished by bringing titanium trichloride into contact with an electron donor compound (such as alcohol, ether, ester, lactone, amine, acid halide, and acid anhydride) and/or an activator (such as a halogen-containing compound [e.g., titanium tetrachloride, silicon tetrachloride, hydrogen halides, and halogenated hydrocarbons] and a halogen [e.g., iodine and chlorine]). Activation of titanium chlorides is well known in the art.

Preferred catalyst components are titanium trichloride, which is obtained by reducing titanium tetrachloride with an organoaluminum compound, and titanium trichloride-aluminum chloride eutectic crystal, which is obtained by reducing titanium tetrachloride with aluminum metal. Both of them are treated with one of the above-mentioned activators.

The organoaluminum compound to be used in combination with the catalyst component includes, for example, methylaluminum dichloride, ethylaluminum dichloride, diethylaluminum chloride, dibutylaluminum chloride, diethylaluminum bromide, ethylaluminum sesquichloride, butylaluminum sesquichloride, triethylaluminum, and triisobutylaluminum. Preferably, among them are alkylaluminum chloride such as diethylaluminum chloride and ethylaluminum sesquichloride. Usually, the organoaluminum compound is used in an amount of 1 to 500 mol for 1 mol of titanium trichloride in the catalyst component.

The Lewis base, which is the remaining component of the polymerization catalyst, is selected from a carboxylic acid ester, ether, and ketone. Examples of the carboxylic acid ester include methyl benzoate, ethyl benzoate, methyl p-toluate, ethyl p-toluate, methyl methacrylate, methyl p-anisate, and ethyl p-anisate. Examples of the ether compound include diethyl ether, dibutyl ether, diisobutyl ether, diphenyl ether, anisole, and phenetole. Examples of the ketone compound include methyl phenyl ketone and ethyl phenyl ketone. Preferred ones among them are methyl p-anisate and ethyl p-anisate which have both the ester linkage and the ether linkage. Usually, the Lewis base is used in an amount of 2 to 60 mol%, preferably 10 to 30 mol%, based on the organoaluminum compound.

The ethylene-propylene random copolymer is produced by random copolymerization of ethylene and propylene in the gas phase or in an inert hydrocarbon in the presence of a polymerization catalyst. Examples of the inert hydrocarbon include propane, butane, pentane, hexane, heptane, octane, decane, cyclohexane, benzene, toluene, and xylene. Usually, polymerization is performed at 0° to 120° C. and, if necessary, in the presence of a molecular weight modifier such as gaseous hydrogen.

According to this invention, it is necessary to use a copolymer containing higher than 70 wt% to 85 wt% of ethylene. If the ethylene content is 70 wt% or lower than 70 wt%, the resulting composition is poor in clarity and stiffness. If the ethylene content is higher than 85 wt%, the resulting composition is poor in clarity and impact resistance. In either case, the resulting composition lacks the balance between stiffness and impact resistance.

The ethylene-propylene copolymer desirably will have a density of 0.875 to 0.915 g/cm$^3$, preferably 0.885 to 0.903 g/cm$^3$, depending on ethylene content. In addition, the ethylene-propylene copolymer will desirably have an MFR of 0.001 to 10 g/10 min, preferably 0.01 to 5 g/10 min.

Preparation of the Composition

The composition of this invention is prepared by mixing 65 to 95 wt%, preferably 75 to 90 wt%, of crystalline polypropylene and 5 to 35 wt%, preferably 10 to 25 wt%, of the ethylene-propylene random copolymer. If the amounts are outside the broad limits, the object of this invention is not achieved. The two components may be mixed by methods well known such as, for example, by using a mixing apparatus such as V-blender, ribbon blender, and Henschel mixer, or a kneader such as extruder, calender roll, and Banbury mixer. The composition of this invention may be incorporated with a variety of additives according to the intended use, such as antioxidants, UV stabilizers, anti-slip agents, and anti-block agents.

Effect of the Invention

The composition of this invention is superior in clarity as well as mechanical properties, particularly impact resistance at low temperatures. Especially, a good effect is produced when the composition contains an ethylene-propylene copolymer which is polymerized with a carboxylic acid ester having both ester linkage and ether linkage. The invention is now described in more detail with reference to the following examples, in which % means wt% unless otherwise noted.

EXAMPLE 1

Synthesis of Ethylene-Propylene Copolymer

Preparation of Catalyst Component

Into a steel ball mill, with the atmosphere replaced with argon, was charged 240 g of commercial titanium trichloride of type AA. Then a reaction product of diethyl ether (12 g) and titanium tetrachloride (2.5 g) was added. The components were pulverized for 10 hours to give the catalyst component.

Copolymerization of Ethylene and Propylene

Into an autoclave were charged 250 mg of the catalyst component obtained as mentioned above, diethylaluminum chloride in an amount corresponding to 3 gram mol for 1 gram atom of titanium in the catalyst component, ethyl p-anisate (abbreviated as EPA) in an amount of 20 mol% based on the diethylaluminum chloride, 600 ml of n-heptane, and 100 ml of hydrogen. reaction was carried out at 70° C. for 1 hour while feeding to the autoclave an ethylene-propylene mixture gas (molar ratio=1.1). The resulting polymer slurry ws placed in methanol, and the polymer precipitates were washed thoroughly with hot n-hexane, followed by drying under vacuum. Thus, there was obtained an ethylene-propylene random copolymer having a density of 0.895 g/cm$^3$ and an MFR of 0.02 g/10 min.

Preparation of Composition

The ethylene-propylene copolymer obtained as mentioned above was mixed with crystalline polypropylene (Y203, a product of Tonen Sekiyu Kagaku Co., Ltd.) having a MFR of 3 g/10 min and an HI of 95.5% at a ratio of 15% to 85%. Mixing was carried out for 5 minutes by using a Brabender Plastometer at 200° C. and 100 rpm. Thus there was obtained a composition of this invention.

The composition was made into test specimens by melt pressing (heating at 210° C. for 3 minutes, and compressing under 100 kg/cm$^2$ for 1 minute, followed by water cooling). The test specimens were used to determine the physical properties of the composition. The results are shown in Table 1. Flexural modulus was measured according to ASTM D790-66, and Izod impact strength was measured according to ASTM D256-56 (at 23° C. and −20° C., with a notch). Haze was measured with a hazemeter (HGM-2D, a product of Suga Shikenki Co., Ltd.) using a 0.5 mm thick specimen formed by pressing.

EXAMPLE 2 AND COMPARATIVE EXAMPLES 1 TO 3

Several kinds of ethylene-propylene copolymers which are different in ethylene content were synthesized in the same way as in Example 1, except that the ratio of ethylene to propylene in the mixture gas was changed. Compositions were prepared from these copolymers in the same way as in Example 1, and test specimens were prepared from the compositions for measurements of physical properties. The results are shown in Table 1.

COMPARATIVE EXAMPLE 4

An ethylene-propylene copolymer containing 75% of ethylene was produced in the same way as in Example 1, except that the polymerization catalyst lacked EPA. A composition was prepared from this copolymer in the same way as in Example 1 and test specimens were prepared from the composition for measurements of physical properties. The results are shown in Table 1.

EXAMPLES 3 AND 4 AND COMPARATIVE EXAMPLES 5 AND 6

Polypropylene compositions were prepared in the same way as in Example 1, except that a change was made in the mixing ratio of crystalline propylene and ethylene-propylene copolymer. The physical properties of the compositions were measured. The results are shown in Table 2.

COMPARATIVE EXAMPLES 7 TO 10 AND REFERENTIAL EXAMPLE

Polypropylene compositions were prepared in the same way as in Example 1, except that the ethylene-propylene copolymer was replaced by ethylene-propylene rubber (EPR), low-density polyethylene (LDPE), or high-density polyethylene (HDPE). Their physical properties were measured. The results are shown in Table 3. Referential example in Table 3 indicates the physical properties of the crystalline polypropylene (PP) used in Examle 1.

Description of the polymers used:

EPR: EP07P, a product of Japan Synthetic Rubber Co., Ltd. (polymerized with a vanadium catalyst), MFR (230° C.): 0.7, density: 0.86 g/cm$^3$, ethylene content: 72%.

LDPE: 8012, a product of Nippon Unicar Co., Ltd., MI (190° C.): 0.25, density: 0.924 g/cm$^3$.

HDPE: B6011, a product of Tonen Sekiyu Kagaku Co., Ltd., MI (190° C.): 0.25, density: 0.954 g/cm$^3$.

TABLE 1

| Example No. | Ethylene content in copolymer (%) | Density (g/cm$^3$) | MFR (g/10 min) | Haze (%) | Flexural modulus (kg/cm$^2$) | Izod impact strength (kg · cm/cm) 23° C. | Izod impact strength (kg · cm/cm) −20° C. |
|---|---|---|---|---|---|---|---|
| Comparative Example 1 | 56 | 0.880 | 0.05 | 54.1 | 9,000 | 10.4 | 4.6 |
| Comparative Example 2 | 68 | 0.884 | 0.04 | 37.0 | 9,100 | 9.8 | 4.4 |
| Example 1 | 75 | 0.895 | 0.02 | 26.6 | 9,150 | 9.8 | 4.3 |
| Example 2 | 85 | 0.902 | 0.01 | 29.0 | 9,300 | 7.5 | 4.3 |
| Comparative Example 3 | 91 | 0.910 | 0.01 | 39.0 | 9,800 | 4.0 | 3.2 |
| Comparative Example 4 | 75 | 0.895 | 0.02 | 35.6 | 8,820 | 8.0 | 4.2 |

TABLE 2

| Example No. | Crystalline polypropylene (%) | Ethylene-propylene copolymer (%) | Haze (%) | Flexural modulus (kg/cm$^2$) | Izod impact strength (kg/cm · cm) 23° C. | Izod impact strength (kg/cm · cm) −20° C. |
|---|---|---|---|---|---|---|
| Comparative Example 5 | 97 | 3 | 27.7 | 10,900 | 4.5 | 3.0 |
| Example 3 | 90 | 10 | 27.0 | 9,500 | 7.0 | 3.5 |
| Example 1 | 85 | 15 | 26.6 | 9,150 | 9.8 | 4.3 |
| Example 4 | 75 | 25 | 27.7 | 8,200 | 13.5 | 7.5 |
| Comparative Example 6 | 60 | 40 | 65.0 | 4,800 | DNB* | 11.2 |

*Did not break.

TABLE 3

| Example No. | PP (%) | EPR (%) | LDPE (%) | HDPE (%) | Haze (%) | Flexural modulus (kg/cm$^2$) | Izod impact strength (kg · cm/cm) 23° C. | Izod impact strength (kg · cm/cm) −20° C. |
|---|---|---|---|---|---|---|---|---|
| Referential Example | 100 | 0 | 0 | 0 | 27.1 | 11,900 | 3.1 | 2.7 |
| Comparative Example 7 | 85 | 15 | 0 | 0 | 71.6 | 8,560 | 32.6 | 3.7 |
| Comparative Example 8 | 85 | 0 | 15 | 0 | 45.5 | 9,830 | 3.3 | 2.4 |
| Comparative Example 9 | 85 | 0 | 0 | 15 | 88.2 | 13,000 | 2.7 | 2.2 |
| Comparative Example 10 | 85 | 5 | 10 | 0 | 29.5 | 9,280 | 4.0 | 2.7 |

What is claimed is:

1. A polypropylene composition which comprises 65 wt% to 95 wt% crystalline polypropylene and 5 wt% to 35 wt% of an ethylene-propylene random copolymer containing higher than 70 wt% to 85 wt% ethylene wherein said ethylene-propylene random copolymer is produced by copolymerizing ethylene with propylene in the presence of a polymerization catalyst comprising a titanium trichloride containing catalyst component, an organoaluminum cocatalyst and a Lewis base.

2. The polypropylene composition of claim 2 wherein the Lewis base is selected from a carboxylic acid ester, an ether or a ketone.

3. The polypropylene composition of claim 2 wherein the catalyst comprises titanium trichloride, diethylaluminum chloride, and ethyl p-anisate.

* * * * *